United States Patent [19]

Sadeghi et al.

[11] Patent Number: 5,035,307
[45] Date of Patent: Jul. 30, 1991

[54] ENERGY ABSORBING DEVICE

[75] Inventors: Majid M. Sadeghi, Newport Pagnell; Vivian M. Stephens, Neaton, both of Great Britain

[73] Assignee: The Secretary of State for Defence in Her Britannic Majesty's Government of the United Kingdom of Great Britian and Northern Ireland, London, England

[21] Appl. No.: 421,593

[22] Filed: Oct. 16, 1989

[30] Foreign Application Priority Data

Feb. 22, 1989 [GB] United Kingdom ................. 8903994

[51] Int. Cl.$^5$ ............................................. F16F 7/52
[52] U.S. Cl. ...................................... 188/372; 74/592; 188/371; 280/777; 280/784
[58] Field of Search ............... 188/371, 373, 376, 377; 74/592; 293/133; 297/473; 280/727, 784, 805

[56] References Cited

U.S. PATENT DOCUMENTS

| 3,181,821 | 5/1965 | Eddins | 188/371 X |
| 3,401,576 | 9/1968 | Eckels | 188/371 X |
| 3,714,859 | 2/1973 | Tupper | 293/133 X |
| 3,983,962 | 10/1976 | Tolke | 188/377 |
| 4,336,868 | 6/1982 | Wilson et al. | 293/133 X |

FOREIGN PATENT DOCUMENTS

| 2222885 | 11/1973 | Fed. Rep. of Germany | 280/784 |
| 1326815 | 7/1987 | U.S.S.R. | 188/377 |
| 1215193 | 12/1970 | United Kingdom | 293/133 |

Primary Examiner—George E. A. Halvosa
Attorney, Agent, or Firm—Nixon & Vanderhye

[57] ABSTRACT

An energy absorbing device, suitable for use in the leg structure of aircraft passenger seating for the purpose of attenuating crash forces, having first and second attachment fittings 11, 21 with a tube 10 of fiber reinforced plastics material extending between them. Tube 10 has a crush initiation band 17 at which buckling of the tube commences upon compressive overload. Long, tough fibers are used as the reinforcing material in the tube so that, when compression of the device has concluded, there is a residual tensile capability. Successful operation of the device is facilitated by providing attachment fitting 12 with a slider 15 which helps to maintain the collapsing portion of the tube in axial alignment with the uncollapsed portion. The slider also acts as a tube wall straightener to unbuckle the collapsed fibers when tensile load is applied.

7 Claims, 3 Drawing Sheets

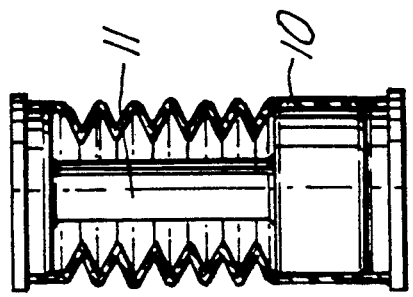
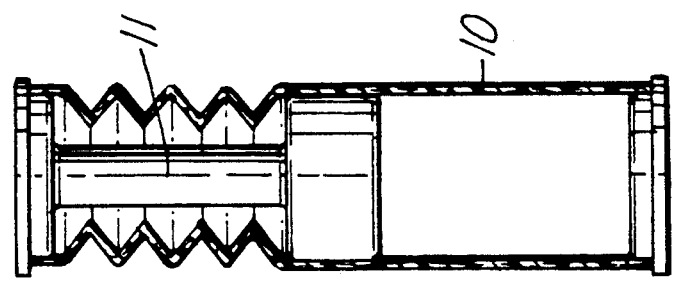
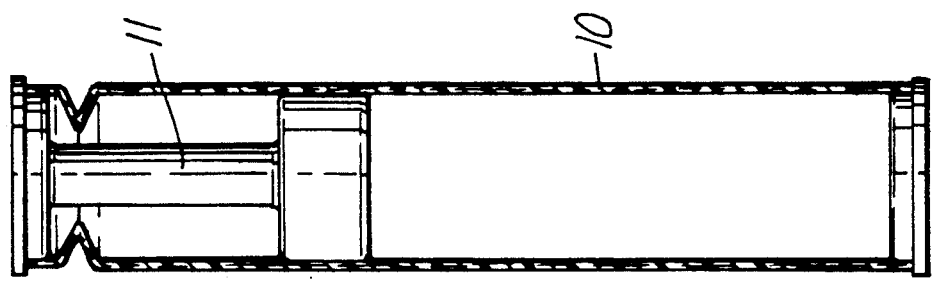
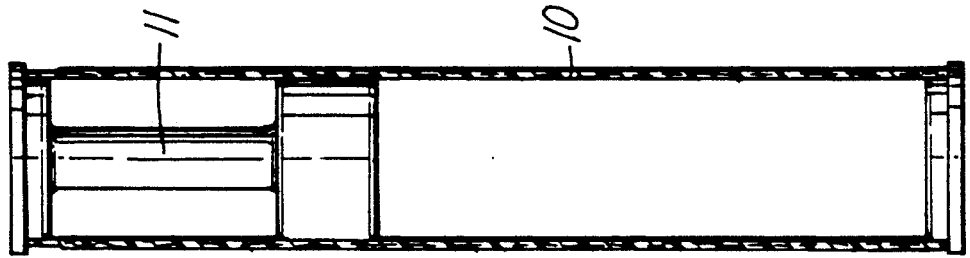

ENERGY ABSORBING DEVICE

This invention relates to an energy absorbing device of a type suitable for use in the leg structure of aircraft passenger seating, where it provides the seat occupants with a degree of relief from the forces experienced in a crash or crash landing situation.

Although the invention is described in the context of aircraft seating (including helicopters) its utility is not limited to this application.

Research has indicated that many aircraft crashes are potentially survivable except that the force of the impact is often sufficient to cause injuries which hinder the passengers' ability to escape from the cabin area. Whilst the injuries in themselves are not necessarily fatal, passengers are incapacitated to a degree which causes them to be overcome by fire or smoke before escape is possible. Those passengers fortunate enough to survive the impact without suffering broken limbs and without falling unconscious due to the sudden deceleration may still find their exit hampered by debris such as unsecured seats which have broken free as a result of the crash forces.

It follows that there is a significant desire to improve the crashworthiness of aircraft passenger seating, but coupled with this there is also a strong commercial desire to reduce the overall weight of aircraft to increase their fuel efficiency. Safer seating which incurs a weight penalty is therefore unlikely to be favourably received.

It is an object of the invention to satisfy both of the above needs by providing an energy absorbing device which is suitable for incorporation into the leg structure of an aircraft passenger seat assembly and which is formed, in large part, from lightweight fibre reinforced plastics material.

The following characteristics are desirable, if not essential, in regard to the primary application of the invention:

(1) The device should form an integral part of the seat assembly leg structure and should be capable of repeatedly withstanding normal loads without deterioration.

(2) It should absorb large compressive forces in order to safeguard the seat occupant.

(3) It should remain intact after controlled collapse to tether the seat in position and thereby maintain escape pathways.

(4) It should resist re-extension in order to attenuate the "rebound" force which follows initial impact.

In order to meet requirements (3) and (4) above, the fibre/resin system must retain some structural integrity after collapse and to this end highly oriented synthetic polymer fibres are preferred.

The use of fibre reinforced plastics materials as energy absorbers is reviewed by Thornton, Harwood and Beardmore in Composites Science and Technology 24 (1985) at pages 275-98. This paper discusses both materials and structural aspects of composite energy absorbers and considers how parameters such as fibre and/or resin choice, the geometry of the structure and the fibre arrangements can influence energy absorbing capacity. It also recognises that composite structures having thin wall-sections require a trigger or crush initiation device to ensure that collapse is initiated in a stable mode. However, the article is guarded about the precise form of the crush initiation device best suited to precipitate collapse in those fibre reinforced plastics which crush by local wall buckling rather than by disintegration.

The invention is an energy absorbing device reactive to a sudden compressive overload and subsequent reversal of load comprising:

a first attachment fitting and a second attachment fitting;

a tube of fibre reinforced plastics material extending between the attachment fittings and secured thereto, said tube having a fibre reinforcement of long tough fibres such that it collapses in a local wall buckling mode in response to the overload without snapping of the fibres:

a crush initiation band disposed on or within the tube, at which wall buckling is precipitated;

guide means to maintain the collapsed portion of the tube in axial alignment with the uncollapsed portion when compression takes place, and a tube wall straightener responsive to re-extension forces which acts so as to press against the tube wall to remove convolutions therein.

The expression "long tough fibres" is used in its conventional sense for fibre composite technology. That is to say, the fibres are of sufficient length to behave indistinguishably from continuous fibres in sustaining tube collapse by local wall buckling and are sufficiently tough to resist brittle fracture when they become bent into a small radius. Very short fibres or whiskers are unlikely to facilitate controlled tube collapse in the desired fashion.

The choice of fibre/resin combination will, to a large extent, determine the collapse characteristics of the device. The most important factor for successful operation of the invention is the mode of collapse of the fibres. As indicated above, the device as a whole is required to collapse by local wall buckling, in which energy is absorbed by crushing of the matrix, failure of the fibre/matrix interface and collapse of the individual fibres. It is clear that a considerable amount of disintegration takes place when the device collapses and this is important for maximizing energy absorption. However, to ensure that some structural integrity is retained after collapse and to provide a residual tensile capability it is essential that a majority of the individual fibres should remain intact in the buckled structure.

Fibres which fracture on compression are unsuitable for exclusive use in this device because they are not capable of resisting tensile loads once fractured. Thus materials such as carbon fibres and glass should be avoided as the sole fibre material. Although they have inherently good tensile properties, the fibres are too brittle to withstand severe buckling without flexural failure.

That is not to say that brittle fibres are totally unsuited to load-limiting applications. In some situations their use is perfectly legitimate because fibre fracture is a recognised energy-absorbing process. It may be possible to absorb the requisite amount of compressive energy, but such a device would not fulfil the objects of the invention especially with regard to its tensile capability.

For this reason the preferred materials are fully aromatic polyamide or "aramid" fibres such as Kevlar (Trade Mark). It is also possible to use fibres of high performance polyethylene which is polyethylene specially formulated for structural applications and having a softening point above 180° C. (see I M WARD: Ultra high modulus polyolefins; Phil Trans R Soc Lond A 294 (1980) pp 473-82).

On bending, aramid fibres are prone to fibrillation which means that the fibres split longitudinally in the bending zone to form a number of discrete fibrils whose limiting bending radius is much smaller than that of the mother fibre. This is similar in many respects to what happens when a green stick is bent and even if the fibres are twisted they prove very difficult to break. This property of aramid fibres is fully exploited in the device according to the invention. Where higher compressive strengths are required it is possible to use "hybrid" tubes in which a mixture of aramid fibres and some other fibre material is utilized.

The selection of a resin material for the matrix is not so critical. Phenolic and epoxy resin systems are preferred, but the toxicity of combustion products means that epoxy resins are unsuitable for use in confined spaces or where air supply is limited. In applications where elevated temperatures are unlikely to be encountered it may even be possible to use some thermoplastic resins.

As indicated above, it is necessary to include a crush initiation device or trigger near one end of the tube to ensure that initial failure of the tube takes place at a predetermined position and in a controlled manner. This is a circumferentially disposed band which acts symmetrically about the tube and may take the form of a locally reduced wall section or a collar of shrink-wrap tape which is applied to the fibre lay-ups prior to curing to give a local reduction in the resin content of the tube and thereby increase the fibre volume fraction to cause a concentration in stress. This collar is preferably removed after curing and before the tube is put into service. It is best to avoid scoring of the tube as an alternative crush initiation mechanism because this is likely to break some of the fibres and may induce an unpredictable mode of collapse.

The collapse characteristics of the device can be varied by altering the geometry of the tube, for example by changing its wall thickness, increasing its diamter or by varying the fibre orientation. In particular, where the tube is formed from a number of pre-impregnated fibre mats, it is possible to influence the collapse characteristics by varying the lay-up sequence: Preferably at least some of the fibres are disposed with a 0/90° orientation relative to the longitudinal axis of the tube so that the 0° fibres are able to sustain tensile loads after collapse of the device. However, it is expected that the tube will often consist of a combination of 0/90° fibres and fibres disposed in some other orthogonal relationship.

Other characteristics of the device according to the invention include:

(1) Reduced susceptibility to Euler buckling or other catastrophic failure modes, and (2) Approximately constant collapse loads over a relatively large axial distance.

The invention will now be described by way of example only with reference to the following drawings, in which:

FIGS. 3A-3D show a collapse sequence for an embodiment of the device using the preferred sliding end attachment;

Figure 1:
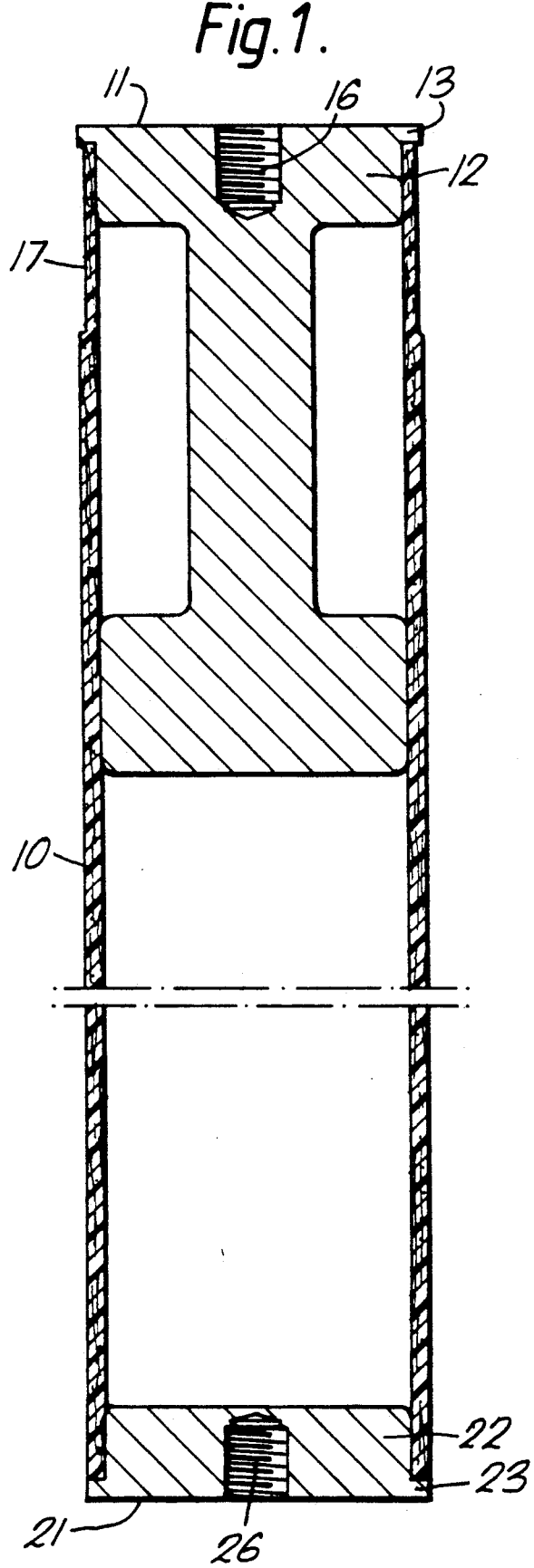
FIG. 1 shows in longitudinal section an energy absorbing device in accordance with the invention.

As shown in FIG. 1, an energy absorbing device comprises a fibre reinforced plastics tube 10 extending between a first attachment fitting 11 and a second attachment fitting 21. The tube has a reinforcement of long tough fibres disposed in a compatible resin matrix, with at least some of the fibres disposed with a 0/90° orientation relative to the longitudinal axis of the tube.

The fibres may be aramid fibres, high performance polyethylene fibres or possibly a hybrid of one or more of these with carbon and/or glass fibres. The matrix may be a phenolic, epoxy or any other resin compatible with the selected firbes and which is suitable for the conditions encountered in end use of the device.

The tube is formed with a smooth internal bore by laying up a number of pre-impregnated woven fibre mats onto an internal mandrel and then curing by the application of heat. Reference numeral 17 indicates a crush initiation band which is here represented as a local section of reduced wall thickness where some of the fibre layers have been terminated short of the tube end.

The attachment fittings 11, 21 are each formed from a light metal such as aluminium alloy and comprise a flange 12, 22 receivable inside the tube 10 and adhesively bonded thereto, with lip portions 13, 23. These extend beyond the outer circumference of the tube and serve to transmit compressive forces evenly over its end. The attachment fittings may also be provided with tapped holes 16, 26 to receive fastening means which facilitate attachment to the component to be supported.

Figure 2:
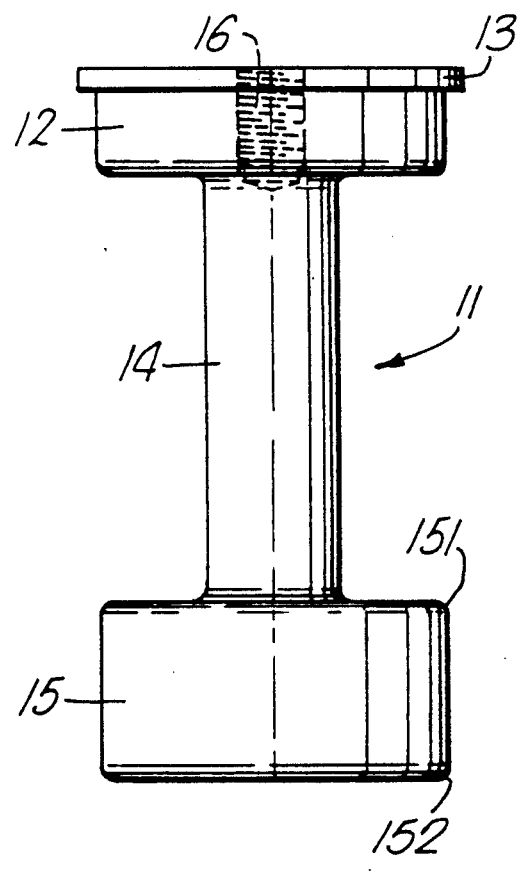
FIG. 2 shows in detail the configuration of a preferred sliding end attachment.

Attachment fitting 11 is integrally formed as a combined guide and wall straightener and is shown in more detail in FIG. 2. Additionally it comprises a solid stem portion 14 depending from the flange 12 with a slider 15 at its distal end which is dimensioned to be a sliding fit inside the tube 10. The stem portion 14 has an axial dimension which is sufficient to allow a predetermined length of the tube to collapse and a diameter small enough to accommodate the folds of the collapsed tube. The slider 15 has an axial dimension which is sufficient to resist lateral forces and thereby helps to maintain the tube in axial alignment during collapse and re-extension. Typically, the length of the slider is equal to half its diameter.

The upper and lower faces of the slider 15 are radiussed as shown at 151 and 152, respectively, to assist in easing passage of the slider through the tube. These radiussed corners should neither be too large in case they compromise the slider's resistance to lateral forces, nor too small lest they act to sever the fibres of the tube. This latter consideration is particularly important when the device is reacting under tensile loading and the slider acts as a wall straightener by pressing against the tube wall to remove it convolutions.

Collapse of the energy absorbing device is depicted in FIG. 3 as a sequence of figures numbered 3A to 3D.

FIG. 3A represents the normal condition before compressive overload, where the device is able repeatedly to sustain everyday loads without deterioration.

FIG. 3B shows the condition when compressive overload is encountered and collapse is initiated. Thanks to the crush initiation band, collapse begins in a predetermined position and occurs symmetrically about the tube.

FIG. 3C shows the tube undergoing collapse in the so-called constant collapse load region. The tube collapses concertina-fashion with the convolutions constrained between the flange and the slider of the sliding attachment fitting. The collapsed portion of the tube is maintained in axial alignment with the uncollapsed portion by virtue of the close fit between the slider and the interior of the tube.

FIG. 3D represents the condition when the available stroke is exhausted.

In order to avoid sudden bottoming-out when the fully-collapsed condition is reached, cushioning means may be provided inside the tube. This may take the form of a piece of phenolic foam which the slider squeezes as it approaches the end of its travel. However, to take full advantage of the weight-saving offered by the device according to the invention it is preferable to avoid add-on weight such as cushioning and in any case it is probably best to avoid resilient cushioning which might contribute to the rebound that the invention is designed to attenuate.

At any point during its collapse the device is able to resist a reversal of load and sustain a tensile force by the mechanism of fibre unbuckling as the slider is withdrawn along the longitudinal axis of the tube. The fibres are not pulled straight. Rather, the convolutions are straightened by the pressing action of the slider against the wall of the tube.

Once the device has collapsed and been fully re-extended, any portion of the tube which has been compressed will have very little structural integrity because the fibres in the compressed portion can do little more than serve as a flexible tether. However, it is expected that, if complete collapse followed by full re-extension of the device is sufficient to attentuate the sudden impact load and subsequent rebound load to a tolerable level, any buffeting which follows will be within normal tolerances.

Figure 4:
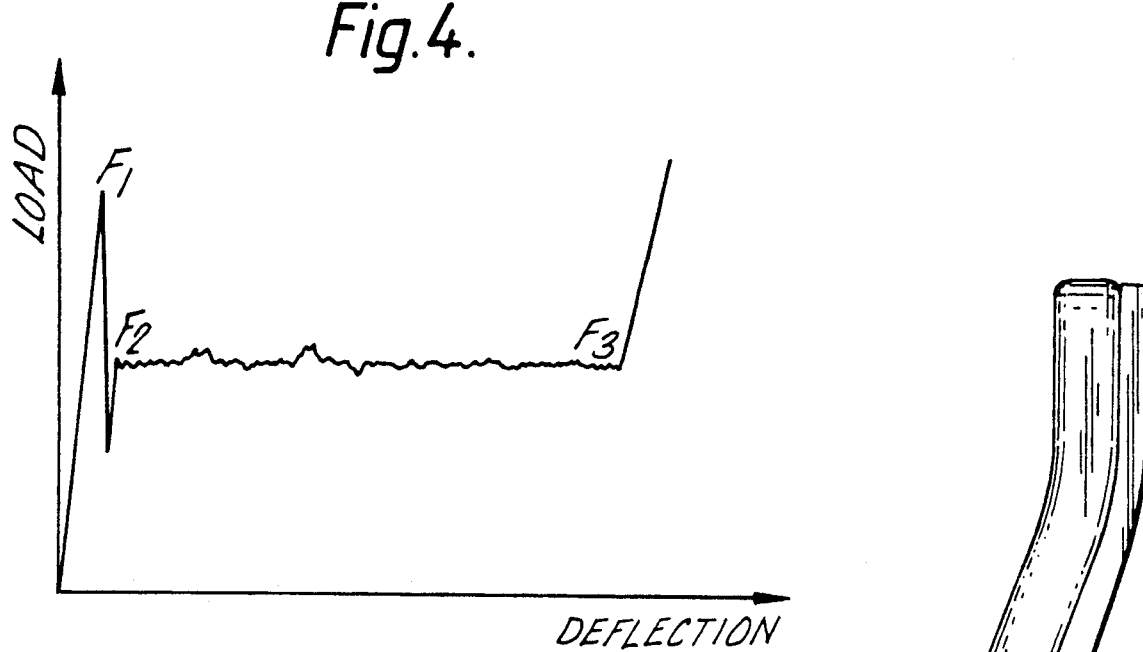
FIG. 4 illustrates graphically the variations in load during the collapse sequence.

FIG. 4 shows a typical load/displacement curve for an energy absorbing device such as that depicted in FIGS. 1 to 3. The peak collapse load is encountered at point F1 where collapse is initiated and then the curve dips to a relatively low level, corresponding to a displacement of between about 5 and 10%, before climbing again to the constant collapse load region. This constant collapse load is represented by the substantially horizontal line between the points F2 and F3. At F3 the available stroke of the device is exhausted and further displacement would only be possible under the exertion of much bigger loads.

Figure 5:
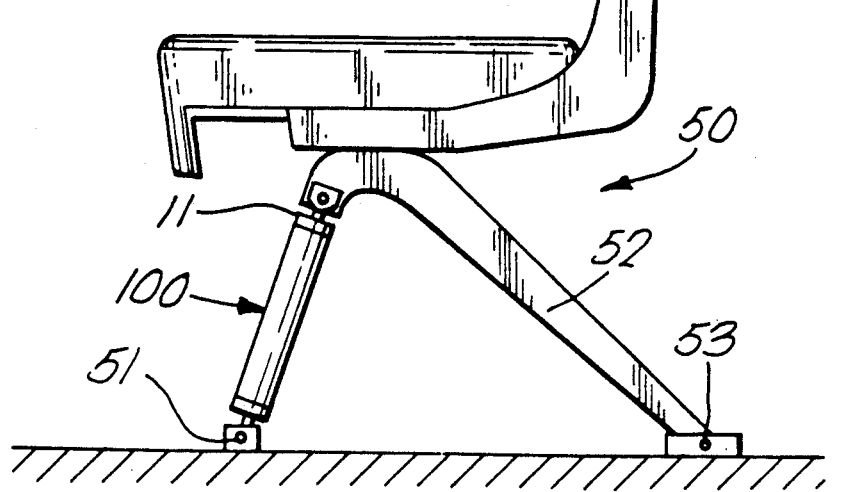
FIG. 5 shows the device in position on an aircraft passenger seat.

FIG. 5 illustrates the device incorporated into an aircraft passenger seat, acting as the front legs in a so-called "A frame" construction. The A-frame is a lightweight metal assembly designated by the reference numeral 50 with the front leg substituted by an energy absorbing leg which incorporates a device 100 according to the invention. The energy absorbing device 100 is anchored to the floor section of the aircraft cabin by its attachment fitting 21 through the agency of a spherical "rose" joint 51. This anchoring arrangement allows angular movement of the device relative to the plane of the floor section to accommodate warpage thereof (in accordance with forthcoming Federal Aviation Authority regulations). The top of the energy absorbing device is secured to the A-frame via attachment fitting 11 in similar fashion. The rear leg 52 is secured to the floor section with a lateral pin joint 53 and thus collapse of the seat assembly as a whole is designed to take place in a forward-tipping motion. This will help to attenuate the forces experienced in a typical crash situation, in which loads are exerted in a generally downward and forward direction.

As an indication of the way in which collapse characteristics can be varied by changing the tube structure, a number of energy absorbing devices were constructed in accordance with the invention and their static performances compared. The tubes were all made from Kevlar (Trade Mark) woven fibre mats disposed in a phenolic resin matrix to a length of 250 mm with a 50 mm internal bore. The lay-up characteristics were as follows:

TYPE A: Five layers of 0/90° prepreg, reducing to three layers for a length of 30 mm at one end;

TYPE B: Five layers of 0/90° prepreg with a double wrap of shrink tape about 7 mm wide in the region 23 to 30 mm from one end;

TYPE C: Three layers of 0/90° prepreg and two layers of ±45° prepreg, reducing to three layers of 0/90° prepreg for a length of 30 mm at one end;

TYPE D: As type C with the addition of a shrink wrap tape around the tube immediately after the reduction in wall thickness.

With the exception of Type D tubes, the devices were tested with both push-fit and bonded attachment fittings.

The results are compared in Table 1.

TABLE 1

| | RESULTS OF STATIC TESTS ON KEVLAR ENERGY ABSORBERS WITH SLIDING END ATTACHMENTS | | | | | |
|---|---|---|---|---|---|---|
| TUBE TYPE | END ATTACHMENT | MEAN LOAD (TONNES) | VARIATION ABOUT MEAN | INITIAL PEAK LOAD (TONNES) | PEAK LOAD/ MEAN LOAD | ENERGY SHORTFALL |
| A | PUSH-FIT | 1.25 | ±27% | 1.28 | 1.30 | 3% |
| A | BONDED | 1.36 | ±20% | 1.54 | 1.13 | 6% |
| B | PUSH-FIT | 1.36 | ±20% | 2.11 | 1.55 | 5% |
| B | BONDED | 1.43 | ±14% | 2.18 | 1.52 | 5% |
| C | PUSH-FIT | 1.22 | ±15% | 1.41 | 1.15 | 4% |
| C | BONDED | 1.25 | ±15% | 1.46 | 1.17 | 6% |
| D | PUSH-FIT | 1.08 | ±17% | 1.15 | 1.50 | 11% |

The reference to "energy shortfall" in Table 1 is meant to indicate the depth of the trough which appears in the load/displacement graph immediately following initial collapse at peak load. It is referred to as a shortfall because where less energy is absorbed the curve deviates from the horizontal plot which would be obtained in the "ideal" case.

From the table it can be seen that tube configuration gives characteristic peak and mean loads for nominally the same length, diameter and wall thickness of tube. This enables the best crush initiation device and/or fibre orientations to be selected for the desired collapse characteristics in a particular application.

Higher peak loads occur in tubes where the crush initiation device is a band of shrink wrap tape and higher mean loads occur in tubes with a greater proportion of 0/90° oriented fibres. The lowest peak and mean loads are therefore found in the Type D devices where the crush initiation device is a combined shrink wrap and reduced wall thickness mechanism and where two of the fibre layers have their fibres disposed in a ±45° orientation relative to the longitudinal axis of the tube. Conversely, the higher peak and mean loads occur in the type B devices where a shrink wrap tape is used on its own for crush initiation purposes and where the fibres are all disposed with a 0/90° orientation.

The devices with bonded end attachments show slightly enhances values for both peak and mean loads, presumably because the bonding process helps to stabilize the tubes against collapse.

Although the invention has been described with particular reference to its application in improving the crashworthiness of aircraft passenger seating, this should not be construed as a limitation on the scope of the following claims.

We claim:

1. A lightweight energy absorber reactive to sudden compressive overload and subsequent rebound forces, comprising:
   a collapsible composite tube comprising a matrix of plastics material reinforced with long fibers in which the reinforcement comprises tough fibers;
   a trigger zone adjacent one end of said tube which comprises a localized circumferential band of weakening in the tube wall which concentrates stresses relative to the other parts of the tube wall;
   a pair of attachment fittings, each one affixed to a respective end of said tube;
   a slider located within the said tube and being a sliding fit therewithin, and
   a stem substantially coaxial with the tube, said stem being affixed at one of its ends to the respective attachment fitting at the end of said tube adjacent to the trigger zone and affixed at its other end to the slider, the length of the stem being such that the slider is held in spaced-apart relationship from said respective attachment fitting at a position beyond the trigger zone,
   whereby longitudinal collapse of the tube commences at the trigger zone through the attachment fittings on application of a compressive load in excess of a predetermined compressive threshold and propagates beyond said trigger zone by a local wall buckling mode on continuance of said excess compressive load, and whereby axial alignment of the tube is maintained during collapse thereof by cooperation between the slider and the uncollapsed portion of the tube.

2. A lightweight energy absorber as claimed in claim 1, wherein the attachment fitting at the end of the tube adjacent to the trigger zone is formed as a unitary fitting with the stem and the slider.

3. A lightweight energy absorber as claimed in claim 1, wherein the trigger zone comprises a circumferential portion of tube having uniformly reduced wall thickness.

4. A lightweight energy absorber as claimed in claim 1, wherein the trigger zone comprises a circumferential portion of tube having a locally increased population of fibers relative to the volume of plastics matrix material.

5. A lightweight energy absorber as claimed in claim 1, wherein the fiber reinforcement comprises fully aromatic polyamide fibers.

6. A lightweight energy absorber as claimed in claim 1, wherein the fiber reinforcement comprises high performance polyethylene fibers.

7. A lightweight energy absorber as claimed in claim 1, wherein the tube is circular in cross-section.

* * * * *